United States Patent
Clark et al.

[11] Patent Number: 5,526,526
[45] Date of Patent: Jun. 11, 1996

[54] SURVIVAL RADIO

[75] Inventors: Mark S. Clark, Ft. Lauderdale; Edward I. Nelson, Plantation, both of Fla.

[73] Assignee: ACR Electronics, Inc., Fort Lauderdale, Fla.

[21] Appl. No.: 323,598

[22] Filed: Oct. 17, 1994

Related U.S. Application Data

[63] Continuation of Ser. No. 842,717, Feb. 27, 1992, abandoned.

[51] Int. Cl.[6] .................................................. H04B 1/40
[52] U.S. Cl. ........................ 455/90; 455/100; 455/128; 455/347; 455/351
[58] Field of Search ........................... 455/40, 90, 89, 455/95, 100, 128, 343, 346, 347, 348, 351, 344, 350; 361/422, 380; 29/522.1; 174/52.1, 52.3; 156/69, 60, 293, 308.4, 308.6, 304.5, 309.6, 309.9; 52/595, 593, 588, 539

[56] References Cited

U.S. PATENT DOCUMENTS

| | | | |
|---|---|---|---|
| 3,635,280 | 1/1972 | Parsons | 156/293 |
| 3,919,034 | 11/1975 | Carini | 156/304.5 |
| 4,181,549 | 1/1980 | McPhee | 156/69 |
| 4,225,970 | 9/1980 | Jaramillo et al. | 455/89 |
| 4,491,970 | 1/1985 | LaWhite et al. | 455/100 |
| 4,673,936 | 6/1987 | Kotoh | 455/100 |
| 4,850,031 | 7/1989 | Allsop et al. | 455/89 |
| 4,931,816 | 6/1990 | Kamo et al. | 354/64 |
| 4,933,963 | 6/1990 | Sato et al. | 455/127 |
| 5,165,816 | 11/1992 | Parasin | 52/595 |
| 5,166,868 | 11/1992 | Stanton et al. | 455/89 |
| 5,175,873 | 12/1992 | Goldenberg et al. | 455/89 |
| 5,199,239 | 4/1993 | Younger | 52/595 |

*Primary Examiner*—Reinhard J. Eisenzopf
*Assistant Examiner*—Nguyen Vo
*Attorney, Agent, or Firm*—Malin, Haley, DiMaggio & Crosby

[57] ABSTRACT

A survival radio for use for transmitting and receiving information for search and rescue having an improved structural housing assembly for increased reliability to prevent moisture and water intrusion, while permitting use of the device in any ambient air pressure. The housing assembly includes a tongue and sealed groove connections joined by deforming the tongue in a pliable state, housing assembly apertures covered by a deformable flexible sealable plastic panel to permit manual actuation of internal switches and an air vent that has a porous plug permitting air pressure equalization between the inside and outside of the housing assembly, while preventing water intrusion.

1 Claim, 5 Drawing Sheets

SURVIVAL RADIO

This application is a continuation, of application Ser. No. 07/842,717, filed Feb. 27, 1992 now abandoned.

BACKGROUND OF THE INVENTION

1. Field of the Invention

This invention relates generally to an improved portable hand-held VHF survival radio that can broadcast and receive audio information, and specifically to an improved portable hand-held radio having a waterproof, lightweight, sealed housing assembly that can withstand extremely diverse ambient pressure environments while remaining waterproof. The invention includes an improved housing assembly that has a sealed front and rear housing, a vent plug for ambient pressure exchange and equalization that is waterproof, and a sealed flexible panel for actuation of the mechanical switches. The radio also includes an improved holding strap that fits onto the housing, and an automatic power turn off switching circuit.

2. Description of the Prior Art

The use of portable hand-held VHF survival radios is well known. Battery operated VHF transmitters and receivers for use in the water or on a life raft in an emergency for communication with search and rescue personnel have been known for many years. The most important aspect of a survival radio is reliability. The radio must withstand long periods of inactive storage. Also, the radio must be able to be subjected to diverse ambient atmospheric pressures in view of possible unpressurized transport of such survival equipment in aircraft at altitudes up to 50,000 feet without structural failures. Any damage to the waterproof seal of the housing assembly could expose the radio interior broadcast and receiver circuitry and batteries to moisture, or worse, if used in the water or a life raft, to surrounding water, which could immediately permanently damage the interior circuitry, disabling the survival radio. Therefore, structural integrity is essential to the reliability of a dependable survival radio.

Another problem in prior survival radios that affects overall reliability for long storage periods can be moisture intrusion. Mechanical switches typically have shafts that protrude through the radio housing assembly for operation of the transmitter, channel selection, and volume, which must connect to the circuitry without exposing the housing assembly contents to moisture with effective long term seals. Also, the use of plastic housing assemblies requires split molds and split housing pieces that ultimately have to be tightly sealed together. Finally, transport of sealed waterproof plastic housing assemblies in jet aircraft result in equipment being subjected to extremely low ambient pressures which could often result in cracks or seal ruptures in the housing assembly, destroying the moisture-proof capability.

The primary purpose of the present invention is to provide a portable, hand-held VHF survival radio that has a radically improved structural housing assembly that is waterproof to at least 1 meter, while allowing for its exposure to very low ambient air pressure, such as may be found at 50,000 feet in an aircraft, without any degradation of the equipment's reliability or waterproof capabilities. Also, the present invention has improved manual switching which utilizes a deformable sealed flexible panel so that exterior manual switching of internal circuitry can be accomplished without switch connectors through the housing assembly wall. The radio housing assembly has a front housing and a rear housing, which are permanently joined together by an improved seal that insures that the housing assembly, once joined together, will not leak or come apart. The hand-held portable unit also includes, attached to the housing, an improved strap for two modes of utilization of the device, and an automatic power off circuit to protect the longevity of the power source.

SUMMARY OF THE INVENTION

An improved housing assembly for a portable hand-held VHF survival radio for the broadcast and receipt of VHF radio frequency energy for particular use in survival situations on international and coast guard distress frequencies.

The internal electrical circuitry, including the antenna and the VHF microprocessor radio signal control, is conventional but for an automatic power off circuit and the conventional circuitry does not in itself form a part of the invention except that the circuitry and manually activated switches controlling the circuitry are strategically mounted within an improved structural housing assembly that constitutes and embodies the present invention. Thus, one of the purposes of the present invention is to provide a structural housing assembly that protects the VHF microprocessor radio circuitry contained within the housing at all times for long periods of time (up to ten years) with extreme reliability. The housing assembly includes specifically a rigid, water impervious, substantially rectangular front housing sized in length, width, and height to be hand-held, said front housing enclosed with a rigid rear housing that acts as a cover made of the same material as the front housing. The housing assembly can be preformed of a particular plastic sold under the trademark ISOPLAST that is lightweight, but that is impervious to air and water. In its initial manufacture, the front wall of the front housing includes a plurality of openings disposed in predetermined locations which are used with a flexible panel for manual switching and speaker location which is described below. A deformable flexible plastic panel is adhesively mounted under pressure over the front housing outside front wall to seal each of the front housing wall apertures both airtight and watertight. The flexible panel allows manually activated switches on the inside of the housing assembly to be depressed from outside the housing assembly, while at the same time maintaining a perfect air and water seal between the outside face of the housing assembly and the inside contents.

The rear housing is also a rigid ISOPLAST plastic and is sized in length and width to fit peripherally against an elongated peripheral tongue of a predetermined size mounted around the perimeter of the front housing which joins in a matching groove located around the peripheral rim of the rear housing. The rear housing also includes an annular passage in a predetermined location that extends from one side to the other. Within the annular passage is mounted an air vent plug which prevents water from passing through the plug (up to a certain water pressure) while at the same time allowing air to pass through the plug in either direction regardless of the ambient air pressure. This air vent allows the inside of the radio housing assembly and the ambient pressure to remain equalized, regardless of whether the radio is at sea level or at 50,000 feet. At the same time, if the radio is dropped into the water, the housing assembly remains waterproof up to at least one meter depth of the water because of the plug material, which will not permit water to be received into the housing.

The vent plug may be bullet-shaped or have two rod-shaped sections of varying diameters and is inserted into the vent channel by crimping and slight compaction which alters the threshold to insure that water up to three feet in depth will not penetrate the plug while air can freely pass through the plug in either direction. The plug material is a low density polyethylene sold under the trademark POREX by Porex Corporation, may be commercially purchased, and has a published air flow rate based on a particular pore size. One of the important aspects of air venting is pressure equalization so that the sealed housing assembly in accordance with the invention can be used at 50,000 feet without breaking the seals in the housing assembly, including the flexible panel so that structural failure resulting in possible leaks will not be produced, even if the radio is transported at high altitudes. This is a very important aspect of this device for the sake of reliability.

Because of the use of the air pressure equalization vent, the flexible panel sealed to the housing assembly may be used that allows exterior manual depression at the apertures to activate specific switches mounted inside the housing without deleteriously affecting the seal around the housing assembly apertures in the front housing front wall that are necessary for access to the interior switches. Finally, the rear housing includes a conveniently employed strap that has two modes, one made for retaining the radio around the wrist to prevent accidental release, and the other made for one-handed operation of the radio, with the fingers through a loop.

It is one aspect of this invention that the method of mounting the front and rear housings together include the tongue and groove structure in which the front housing tongue is deliberately made slightly longer than the depth of the rear housing groove. When the tongue and groove are united to close the housing assembly, solvent containing premixed plastic pellets (7% by amount weight) are used to act as a melting force on the tongue. Under extreme pressure, the excess length of the tongue in a melting state will be deformed to firmly fill up the width of the groove. The amount of tongue deformation in said groove is limited by a built-in stop between said front and rear housing. A tight permanent seal is formed completely around, joining the rear housing firmly to the front housing, completely around the perimeter. This prevents air, moisture, water or any other materials from being received into the interior chamber of the radio housing assembly through the tongue and groove areas. By using the tongue and groove joinder with the solvent which eventually evaporates leaving both the tongue and groove portions as a joined unitary mass forming an integral seal, the tongue and groove joint also, through this method, fills up any imperfections or intolerances originally existing in both the tongue and the groove surfaces.

Because of the flat flexible panel that is used to seal, and yet deformably actuate, internal switches, it is possible that without being able to see the location of a switch, the user may not know whether the radio is in an on or off power mode because of conventional squelching circuits which reduce noise to a point where one does not hear any activity over the radio, even when the power is on. Therefore, use of the radio includes an automatic power off switching circuit that automatically turns the power off after a predetermined time (15 minutes), if none of the switches in the radio have been activated for that length of time. This is to protect the battery power supply to prevent the battery from being run down by leaving the power switch on during periods of non-use.

It is an object of this invention to provide an improved sealed housing assembly that can be used in any ambient pressure environment without destroying the sealing capabilities of the housing and is especially suited for hand held portable survival radios.

It is another object of this invention to provide an improved VHF survival radio of increased reliability that is waterproof, provides an air vent for equalizing pressure within and without in any ambient environment, while at the same time allowing for watertight actuating switches which can be used to turn the device on and off.

And yet another object of the invention is to provide a lightweight portable survival radio for broadcast and receipt of VHF information of extreme reliability that is waterproof up to one meter without water intrusion.

But yet still another object of this invention is to provide improved method for mounting a plastic front housing onto a rear housing to provide a reliable water and airtight seal in the housing assembly, using a deformable tongue and groove structure.

In accordance with these and other objects which will become apparent hereinafter, the instant invention will now be described with particular reference to the accompanying drawings.

DESCRIPTION OF THE PREFERRED EMBODIMENTS

Figure 1:
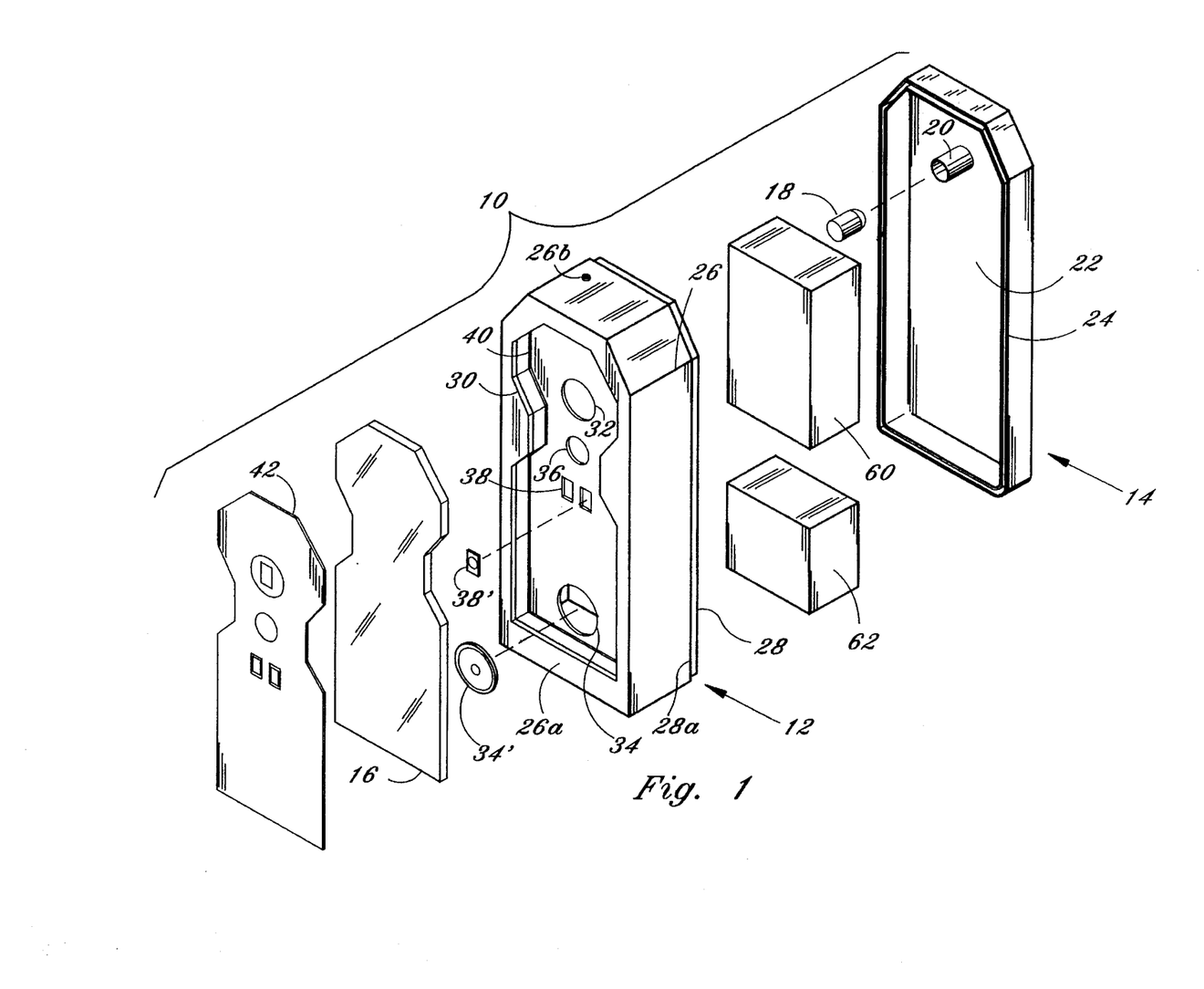
FIG. 1 shows an exploded view in perspective of the present invention.
Figure 1A:
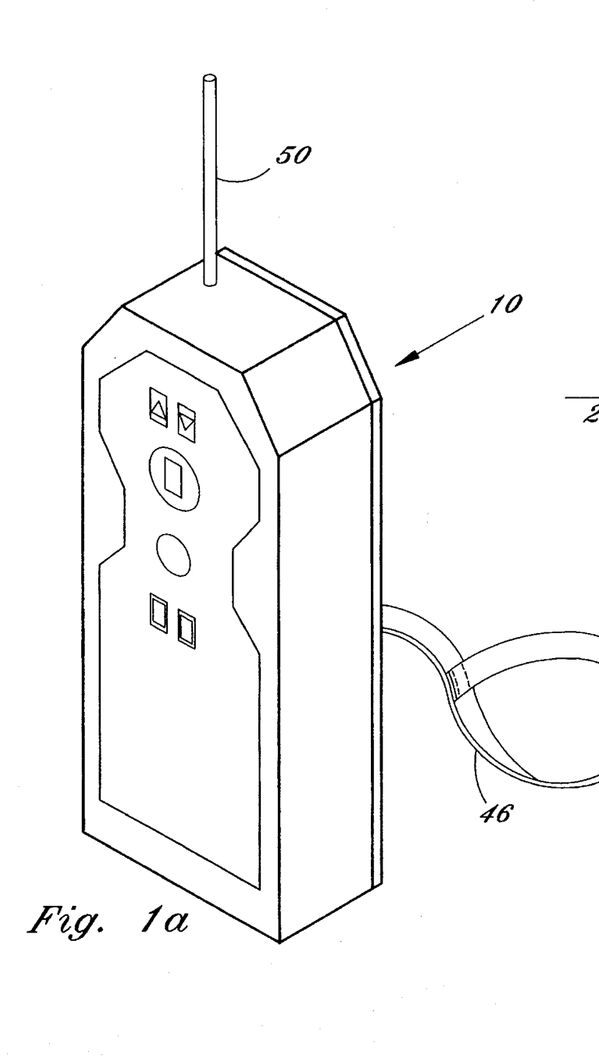
FIG. 1A shows a perspective view of the present invention.

Referring now to the drawings, and primarily FIG. 1 and FIG. 1A, the present invention (shown generally at 10) comprises a portable radio that contains microprocessor, battery, and electrical circuitry required to transmit and receive VHF energy through an antenna 50 in a housing assembly.

FIG. 1 shows an exploded view of the invention 10, which is a housing assembly comprised substantially of a rectangular rigid water impervious plastic front housing 12 that is portable and sized to be grasped and held by a human hand. Attachable to the front housing through a process described herein below is a rear housing 14, that acts as a cover which connects and seals to front housing tongue 28 along peripheral groove 24 extending completely around the periphery of rear housing 14. The front housing tongue extends peripherally completely around the front housing 12.

The front housing 12 is comprised of rigid flat rectangular surfaces 26 integrally molded as one piece and includes a front face 26a that has a plurality of apertures, such as circular apertures 32, 34 and 36 and rectangular apertures 38. Each of the apertures has a specific function to provide access to the housing interior for manual switch depression through flexible panel 16 or access for an internal speaker, for sound transfer. Internal speaker 34' and switch 38' are shown which occupy their respective apertures 34 and 38. Flexible panel 16 is sealed to the front housing front face by a suitable adhesive to prevent air or water penetration into the front housing through the apertures.

The flexible (but water and air impervious) plastic panel 16 is adhesively joined to and fits into a recessed portion 30 in the front face 26a of front housing 12 with adhesive 40 disposed throughout the recessed area to effectively attach and seal the flexible plastic panel 16 to the inside recessed area of housing face 26a. Note however, that because panel 16 is deformably flexible through manual digit pressure (finger or thumb), the front surface 26a of front housing 26, and in particular the apertures such as 32 and 36, will allow inward penetration of flexible panel 16 to activate one or more switches mounted inside the housing assembly. At the same time, however, the flexible plastic panel 16 totally seals each of the apertures so that although the switches can be manually activated from outside the housing assembly, no air or water can enter the front housing through the apertures. A labeling decal 42 can be attached by adhesive onto one side of panel 16 so that the switches inside the housing are quickly identified, such as an on/off switch, push to talk button, channel select switches and the like.

Figure 7:
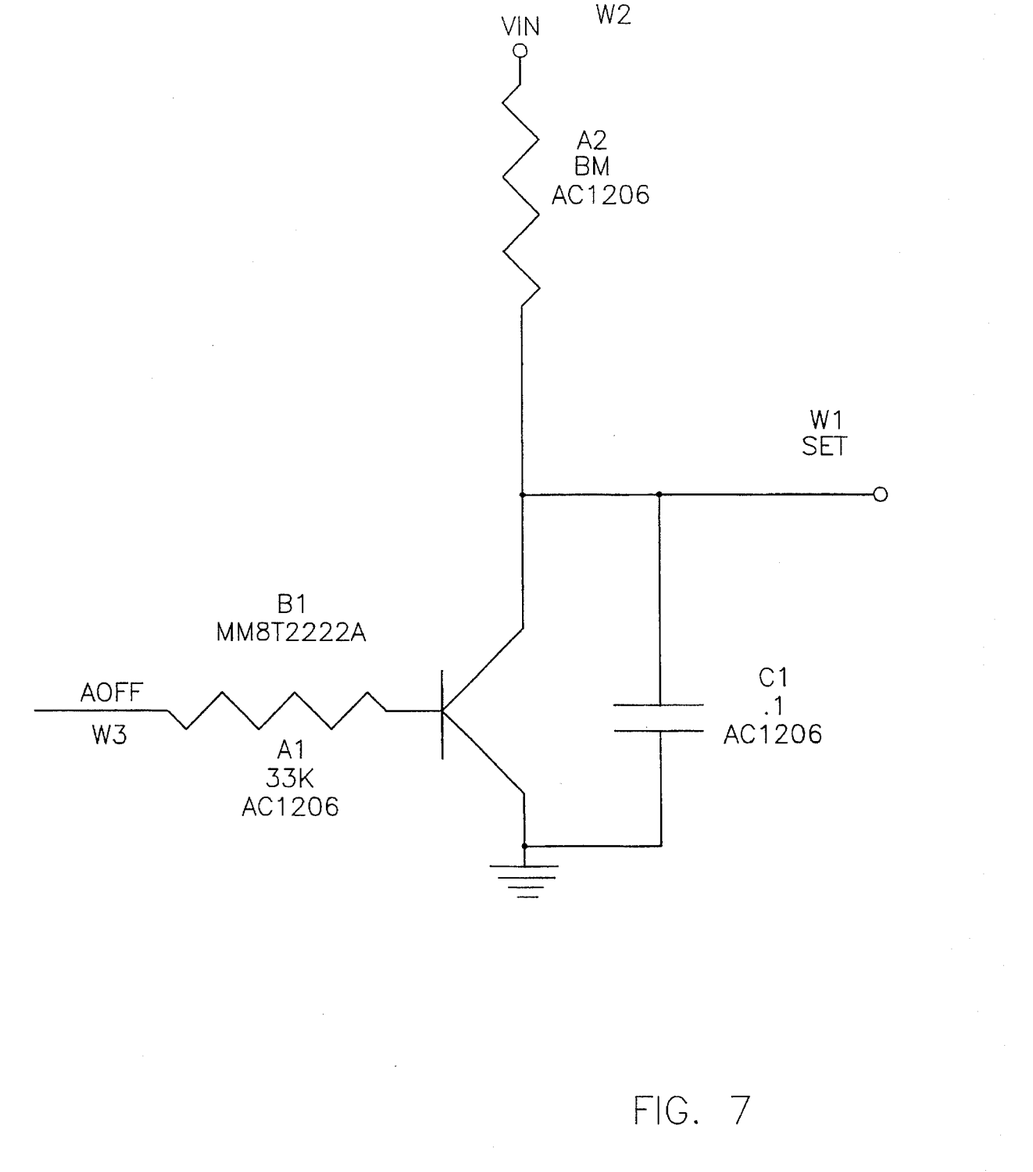
FIG. 7 shows a circuit diagram of an automatic power turnoff circuit used in the present invention.

As shown by the box diagrams 60 and 62, circuits and switches 60 are contained inside the housing, along with the speaker and a power supply in box 62, all of which are conventional and do not independently form a part of this invention except for the automatic turnoff switch circuit (FIG. 7). In addition, an antenna 50 can be mounted to connector 26b, which provides for electrical connections through the housing while the housing still remains sealed by having electrical conductors mounted through the plastic housing in a sealed relationship. In addition, the metal antenna can be covered with a plastic or rubber cover.

Rear housing 14 includes a rigid, substantially rectangular plastic wall 22 having a groove 24 disposed peripherally which is sized to receive tongue 28 in a sealed relationship, sealing both as to air and water, so that rear housing 14, after all the switches, circuitry, speaker and power supply are mounted inside the housing assembly, is permanently sealed to front housing 12 forming the housing assembly.

A rear tubular passage 20 provides a channel that extends through rear housing 14 through rigid surface 22. A porous Porex plug 18, when crimped in place (slightly larger before placing to passage 20a), is permanently mounted within passage 20. The plug 18 material is porous enough to allow air to pass through passage 20a in both directions inside and outside the housing assembly, but will not permit water to pass through, thereby keeping the inside of the housing assembly waterproof (at least up to one meter water depth) while at the same time allowing for air pressure equalization between ambient pressure and the inside air pressure in the housing assembly. This air vent, plug, and passage chamber is very important, for if the survival radio is transported in an aircraft at 50,000 feet in an unpressurized cargo bay, it is possible that the adhesive seal between flexible plastic panel 16 and the front housing 12 could be broken, which would allow air or moisture into the housing assembly.

Figures 2, 2A:
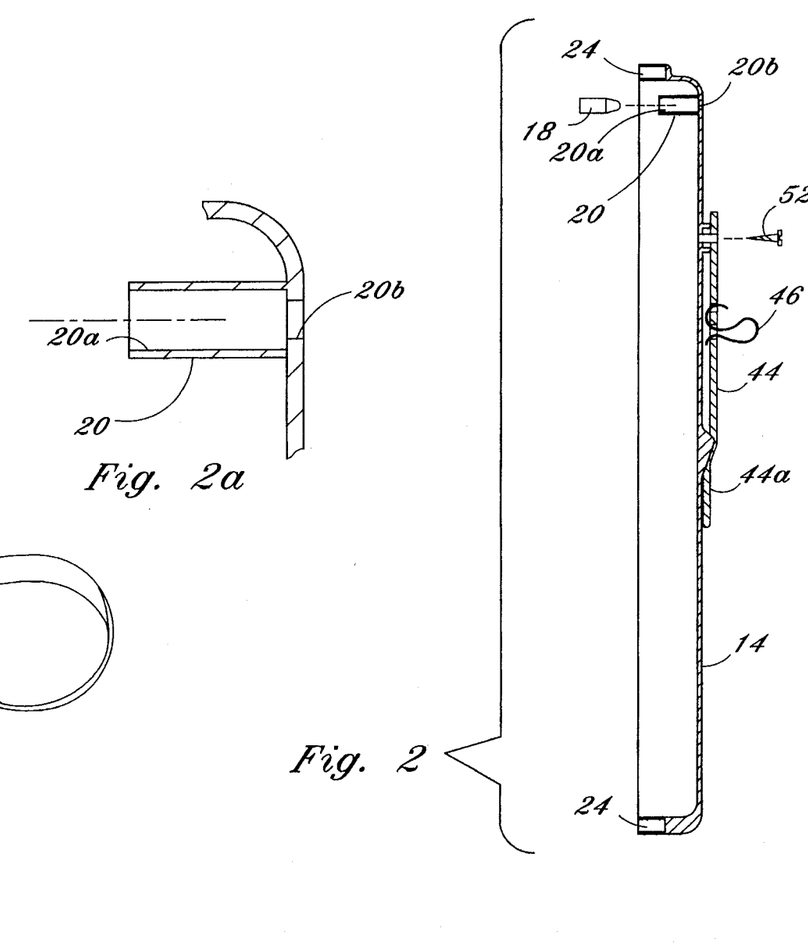
FIG. 2 shows a side elevational view of the rear housing in cross-section.
FIG. 2A is an exploded, cutaway side elevational cross section of the vent passage.

Referring now to FIG. 2, a side view of the rear housing 14 is shown that clearly shows the peripheral groove 24 and passage 20 that receives porous plug 18. The passage 20 may include one section of smaller diameter 20b and a section of larger diameter 20a, the smaller diameter 20b preventing the plug from passing through the passage and holding the plug in place. The smaller passage section 20b also is exposed to less water cross-section on the outside. A screw or other fastener 52 is shown which can be mounted into rear housing 14 to hold the strap bracket for strap 46 shown in FIG. 1A. The strap is discussed below.

Figure 3:
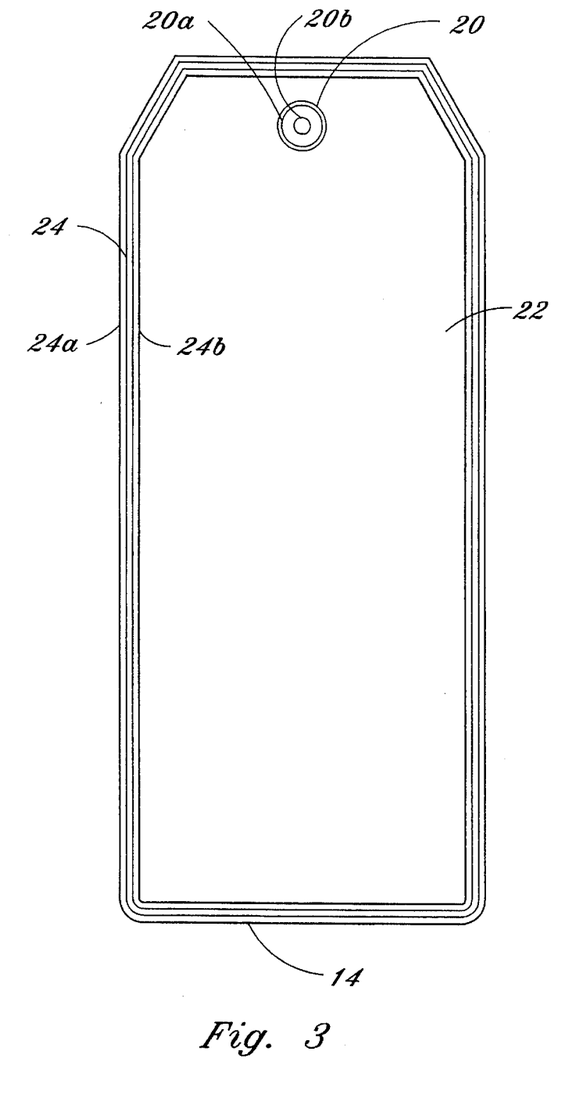
FIG. 3 shows an inside elevational view of the rear housing in accordance with the present invention.

FIG. 3 shows an inside front view looking at the groove 24 formed by raised portions 24a around the periphery and shows the circular plug passage 20 that projects out forming a passage 20a and 20b through the rear housing wall.

Figure 4:
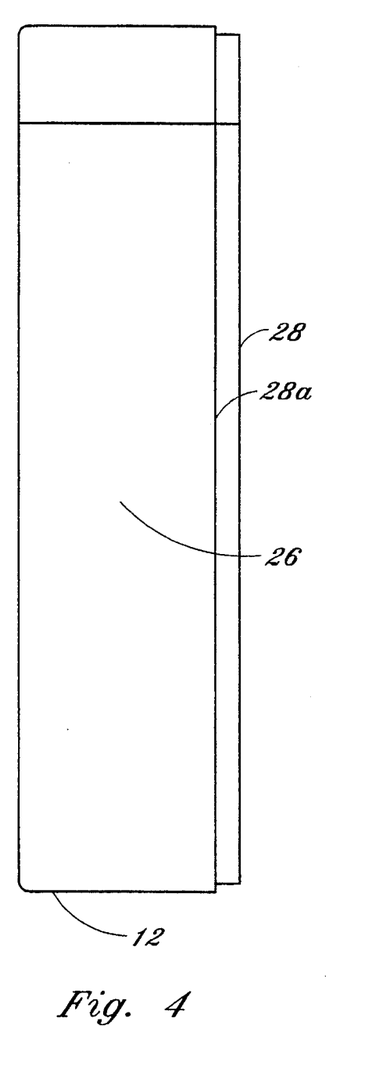
FIG. 4 shows a side elevational view of the front housing.

FIG. 4 shows tongue 28 distinguished by a ledge recessed portion 28a which is mounted around front housing 12 that joins into the groove 24 in rear housing 14.

Figure 5A:
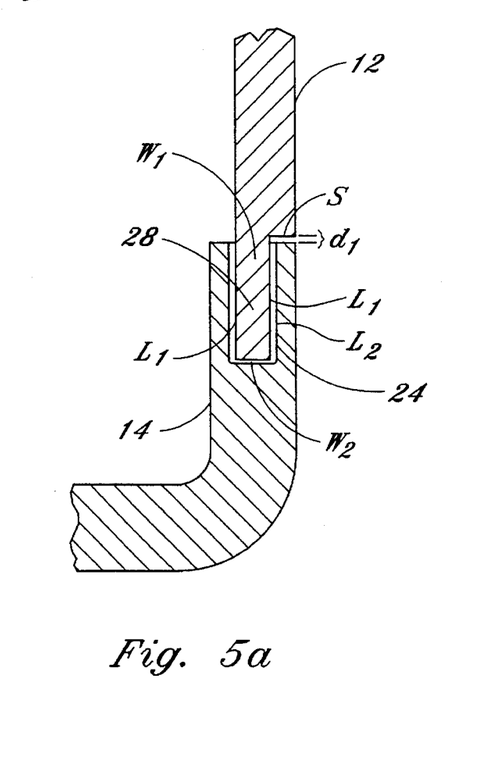
FIG. 5A shows a cutaway cross-sectional view in elevation of the tongue and groove relationship around the perimeters of the front housing and the rear housing prior to engagement.
Figure 5B:
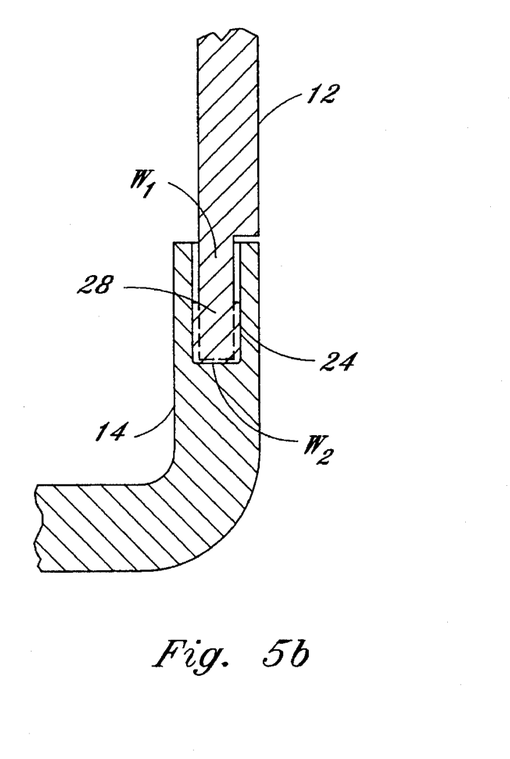
FIG. 5B shows the engagement of the tongue and groove in a top plan cross-sectional view partially cut away.

FIGS. 5A and 5B show the relationship between tongue 28 on front housing 12 and groove 24 as part of the rear housing having wall 22. L1 represents the overall length of the tongue, while L2 represents the depth of groove 24. In the construction of the invention, the tongue L1 is longer than the groove L2 depth to provide a deformation limit d1. In the process of joining and sealing the rear housing 14 to the front housing 12, a solvent/glue N,N-dimethylacetamide with approximately 7% plastic ISOPLAST pellets by weight is applied to tongue 28 that causes the tongue 28 to, in effect, melt or become very pliable. Once the deformable condition of tongue 28 has been accomplished, the rear housing 14 is then joined under great pressure to the front housing with the tongue 28 being forced into a groove wherein the tongue is actually longer than the groove, but stops before filling the groove. Being deformable, the tongue and groove both fuse together with the solvent which eventually evaporates, leaving a sealed joint, without overfilling the groove. The tongue width W1 is smaller than the groove width W2. The stop "S" insures that the groove will not overflow. The residual solvent on the tongue causes the groove to partially dissolve and become one continuous material with the tongue.

Figure 6:
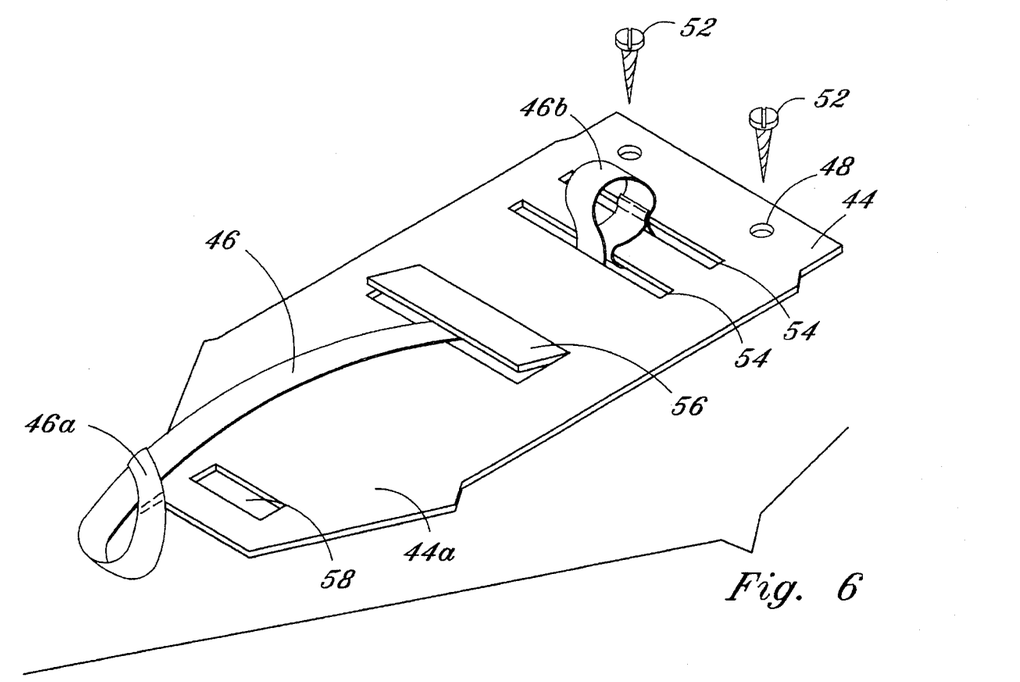
FIG. 6 shows a perspective view of an attaching strap and bracket that is attached to the rear housing in accordance with the present invention.

FIG. 6 shows a bracket 44 that can be made out of metal, that attaches to the outside wall of the rear housing by screw fasteners 52 through fastener holes 48. A strap 46 made out of nylon or other suitable fabric is received through a pair of slots 54 and through an additional raised slot portion 56 so that the strap is firmly attached to the bracket 44 and includes a first adjustable loop 46a which can be held around an object or the wrist to prevent loss of the device. A second adjustable loop 46b holds the radio on the user's fingers in the correct position for thumb operation even with gloves on. Thus, the strap 46 has two separate modes of use. The bracket can be mounted by fasteners 52 to raised portions of the cover such that there is no penetration through rear housing 14, even though the fasteners attach the plate thereto so that the water impervious integrity of the housing is not compromised.

FIG. 7 shows an automatic power shutoff switch circuit that is utilized so that if none of the switches are activated for transmission volume for a predetermined period of time such as fifteen minutes, the automatic switching circuit will turn the power supply off. Basically, as shown in FIG. 7, the circuit will not shut off the power supply as long as it receives a signal within a fifteen minute period, the signal being from the other circuitry used for activating the transmitter or volume switches. The automatic circuit is necessary because the power supply switch cannot visually be determined to be on or off and with modern day squelching circuits which reduces the noise in the receive mode to an inaudible state, it is not apparent when the radio is on or off. If the device is left on for a long period of time, the battery will become inoperative and diminished to the point that the radio would not be operative. Therefore, the automatic shutoff switch will turn the power off after fifteen minutes of inactivity in using the radio.

In operation, the housing assembly has such sealed integrity based on the construction described herein, both with the sealed flexible panel that covers the switches in the housing assembly, and the sealed integrity of the groove and tongue that joins the front and rear housings, that the reliability of this improved survival radio is greatly enhanced because moisture and water cannot get into the structure. Based on this, the radio can be stored for up to 10 years, but as already discussed, it can be used in virtually any ambient environment without destruction of the seals, including aircraft flights above 50,000 feet in an unpressurized environment. It is also so rigidly structured that it can withstand vibrations and other environments that might deleteriously affect its sealed structure.

To operate the radio, one merely depresses the ON/OFF switch and then proceeds to transmit and receive in accordance with the instructions on the device.

LED's (light emitting diodes) can be mounted in the housing assembly and connected to the circuitry. The flexible panel 16 can be transparent or translucent to permit light transmission from the LEDs from inside the housing assembly through an aperture near an internal switch to identify the channel by illuminated number or to locate the "Push-To-Talk" switch by a blinking LED light.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. An emergency radio transmitter and receiver waterproof for at least five minutes in three feet of sea water and vented to atmospheric pressure from sea level to above 50,000 feet of ambient pressure, said emergency radio transmitter and receiver comprising:

radio frequency transmitter and receiver circuitry;

an antenna and an electrical power source attached to said radio frequency transmitter and receiver circuitry;

a plurality of electrical switches for actuating said power source and for controlling said radio frequency transmitter and receiver circuitry connected to said radio frequency transmitter and receiving circuitry;

a water impervious housing assembly portably sized to be hand-held, said housing assembly containing said radio frequency transmitter and receiver circuitry and said power source mounted therein, protected from ambient moisture, said antenna being connected to said radio frequency transmitter and receiver circuitry through said housing assembly, said housing assembly including a rigid front housing and a water impervious sealed rear housing joined together;

said plurality of electrical switches being mounted inside said housing assembly disposed adjacent said rigid front housing, the plurality of switches including an on/off switch for activating or deactivating said radio frequency transmitter and receiving circuitry and a switch for activating and deactivating the radio frequency transmitter for controlling said radio frequency transmitter and receiver circuitry, said rigid front housing of said water impervious housing assembly having a first aperture for accessing manually said on/off switch, said rigid front housing having a second aperture for accessing manually said transmitter on/off switch and said rigid front housing having a third aperture for accessing an internal speaker, for sound transfer;

an air pressure relief vent connecting the inside of said housing assembly to the outside ambient air to provide ambient air pressure equalization between said housing assembly inside and said housing assembly outside, said vent including an air porous plug mounted within said vent, said porous plug allowing the transfer of air between the inside and outside of said housing assembly, but preventing moisture from passing through said porous plug, said air pressure relief vent being impervious to water up to a depth of three feet for a period of five minutes while allowing ambient air transfer from sea level to above 50,000 feet to prevent internal pressure destruction of the water impervious seal of the housing assembly;

a thin flexible panel attached to a recessed external surface of said rigid front housing of said housing assembly for sealingly covering said plurality of switches apertures and said speaker aperture, said flexible panel covering at least said first aperture used for said on/off switch, said second aperture used for said transmitter switch and said third aperture used for said speaker, said rigid front housing including a recessed portion for receiving said flexible panel;

adhesive means for attaching said flexible panel to the recessed external surface of said rigid front housing, making the front housing and flexible panel water impervious;

said flexible panel being water impervious and air impervious and sufficiently flexible to permit manual depression of each internal switch mounted inside said housing assembly from outside housing assembly;

said rear housing and said front housing including a sealable locking means that is water impervious, said water impervious locking means further including an elongated tongue mounted around the periphery of said front housing and said rear housing, having a peripheral groove, said front housing tongue and said rear housing groove are sized for a predetermined fit, wherein the length of said tongue is greater than the depth of said groove;

a solvent for making said tongue semi-resilient for a predetermined period of time and deformable for a predetermined period of time, said tongue being forced under pressure into said groove, said solvent including pellets of plastic material for fusing said tongue and said groove thereby forming a sealed lock around said tongue and groove between said front housing and said rear housing;

a stop mounted between said front housing and said rear housing to control the amount of deformation of said tongue when said tongue is forced in said groove; and wherein said emergency radio transmitter and receiver permits atmospheric ambient pressure equalization from the internal housing assembly to outside the housing assembly from sea level to above 50,000 feet without destroying a water impervious seal formed between said housing assembly, front housing and rear housing, and the water impervious seal between said flexible panel and said rigid front housing.

* * * * *